US008940113B2

(12) United States Patent
Lindner et al.

(10) Patent No.: US 8,940,113 B2
(45) Date of Patent: *Jan. 27, 2015

(54) METHOD AND APPARATUS FOR DETERMINING PROPER CURING OF PIPE LINERS USING DISTRIBUTED TEMPERATURE SENSING

(75) Inventors: Richard Lindner, Morristown, NJ (US); Stephen Vincent Gearhart, Clear Lake, IA (US)

(73) Assignee: Envirosight LLC, Randolph, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,119

(22) Filed: May 25, 2012

(65) Prior Publication Data

US 2012/0261050 A1 Oct. 18, 2012

Related U.S. Application Data

(63) Continuation of application No. 13/417,815, filed on Mar. 12, 2012, which is a continuation of application No. 13/085,963, filed on Apr. 13, 2011.

(60) Provisional application No. 61/473,459, filed on Apr. 8, 2011.

(51) Int. Cl.
*B32B 41/00* (2006.01)
*B32B 37/02* (2006.01)
(Continued)

(52) U.S. Cl.
CPC ............... *B32B 37/02* (2013.01); *B32B 37/06* (2013.01); *B32B 37/10* (2013.01); *B32B 37/14* (2013.01); *B32B 41/00* (2013.01)
USPC ............. 156/64; 156/350; 156/359; 156/367; 156/378; 156/379

(58) Field of Classification Search
CPC ........ G01K 11/32; G01K 1/14; F16L 55/165; A61B 2017/00084; B29B 13/024; B29C 63/0069
USPC .................... 156/64, 350, 359, 367, 378, 379
See application file for complete search history.

(56) References Cited

U.S. PATENT DOCUMENTS

| 4,350,548 A | 9/1982 | Zenbayashi et al. |
| 5,172,730 A | 12/1992 | Driver |

(Continued)

FOREIGN PATENT DOCUMENTS

| DE | 102010011610 | 9/2011 |
| EP | 0122246 | 10/1984 |

OTHER PUBLICATIONS

"Locating illicit connections in storm water sewers using fiber-optic distributed temperature sensing", Hoes, et al., Water Research, vol. 43, Issue 20, Dec. 2009, Abstract only.

(Continued)

*Primary Examiner* — Jeff Aftergut
*Assistant Examiner* — Joshel Rivera
(74) *Attorney, Agent, or Firm* — Saul Ewing LLP; Stephen J. Driscoll (57) ABSTRACT

The present invention relates to methods and apparatus utilizing distributed temperature sensing (DTS) to monitor the temperature of a cured-in-place pipe liner to determine if proper curing temperatures and times are achieved. More particularly, an optical fiber is placed between the pipe and the liner running the entire length of the liner. The optical fiber is coupled to a DTS unit. During curing of the liner, the DTS unit sends light pulses down the fiber from one end and detects the characteristics and time delay of light backscattered to the unit. The characteristics are indicative of the temperature of the optical fiber, while the delay is indicative of the round trip time of the light within the fiber, and thus the distance from the DTS unit from which any particular backscatter signal originated.

14 Claims, 7 Drawing Sheets

(51) Int. Cl.
*B32B 37/06* (2006.01)
*B32B 37/10* (2006.01)
*B32B 37/14* (2006.01)

(56) References Cited

U.S. PATENT DOCUMENTS

| | | | |
|---|---|---|---|
| 5,499,313 | A | 3/1996 | Kleinerman |
| 5,749,548 | A * | 5/1998 | Tamura et al. ............... 248/49 |
| 6,004,639 | A | 12/1999 | Quigley et al. |
| 6,527,441 | B1 * | 3/2003 | Cranch et al. ............... 374/161 |
| 6,960,025 | B2 | 11/2005 | Gurreri |
| 7,031,567 | B2 | 4/2006 | Grinderslev et al. |
| 7,325,976 | B2 | 2/2008 | Gurreri et al. |
| 7,331,719 | B2 | 2/2008 | Manning et al. |
| 7,374,127 | B2 | 5/2008 | Gallasher et al. |
| 7,461,983 | B1 | 12/2008 | Gurreri et al. |
| 7,567,743 | B1 | 7/2009 | Erdman et al. |
| 7,651,277 | B2 | 1/2010 | Gurreri et al. |
| 7,722,261 | B2 | 5/2010 | Kadar-Kallen et al. |
| 7,775,725 | B2 | 8/2010 | Grinderslev |
| 7,988,367 | B2 | 8/2011 | Gurreri et al. |
| 2006/0067636 | A1 * | 3/2006 | Bludau et al. ............... 385/135 |
| 2006/0151042 | A1 | 7/2006 | Stringfellow et al. |
| 2008/0050073 | A1 * | 2/2008 | Kadar-Kallen et al. ......... 385/79 |
| 2008/0185144 | A1 | 8/2008 | Lovell |
| 2009/0092173 | A1 | 4/2009 | Glombitza |
| 2009/0205733 | A1 | 8/2009 | Stringfellow et al. |
| 2009/0308475 | A1 | 12/2009 | Stringfellow et al. |
| 2011/0030875 | A1 | 2/2011 | Conte et al. |
| 2011/0186203 | A1 * | 8/2011 | Lindner et al. ............... 156/64 |

OTHER PUBLICATIONS

Sensornet Gas Pipeline Leak Detection Case Study, printed on Apr. 1, 2011 from the internet.
International Search Report and Written Opinion issued in PCT/US2012/032492, dated Jun. 22, 2012 and mailed Jun. 29, 2012.

* cited by examiner

FIG. 7

METHOD AND APPARATUS FOR DETERMINING PROPER CURING OF PIPE LINERS USING DISTRIBUTED TEMPERATURE SENSING

CROSS REFERENCE TO RELATED APPLICATIONS

This continuation application is based on, and claims priority to, U.S. Provisional Application No. 61/473,459, filed Apr. 8, 2011, and U.S. Non-Provisional application Ser. No. 13/085,963, filed Apr. 13, 2011, and U.S. Non-Provisional application Ser. No. 13/417,815, filed Mar. 12, 2012, the entire contents of which are fully incorporated herein by reference.

FIELD OF THE INVENTION

The invention relates generally to the curing of cured-in-place pipe liners. More specifically, the invention relates to a method and apparatus for assuring that a cure-in-place liner installed in a pipe is fully cured.

BACKGROUND OF THE INVENTION

It is often necessary to repair pipes, tubes and the like, such as sewer pipes, that are disposed in locations that are difficult or impossible to access. Some such situations are encountered in connection with underground sewer, storm water, potable water, gas, and other utility pipes. As pipes age, they begin to leak or fail structurally and require replacement or repair. Replacing pipes, especially underground, can be extremely difficult and expensive. Accordingly, technologies have been developed to repair pipes in locations that are difficult to access, rather than replace them. One such technology involves the use of cured-in-place pipe liners that can be inserted within old pipes to essentially replace the old pipes. Specifically, cured-in-place pipe liners are known in which a flexible tube (often referred to as a sock or bag) comprising a curable resin disposed on a backing sheet, such as a felt or polymer sheet, is used to line the inner diameter of an old pipe with what will essentially be a new pipe. Cured-in-place pipe liners are very cost effective because they require little or no digging, i.e., access is necessary only at the upstream and downstream ends of the pipe segment to be lined, which commonly are readily accessible through manholes.

Cured-in-place linings for sewer pipes, for example, can be installed in segments of very long lengths, reaching several kilometers, if necessary. However, segments of 360-400 feet between manholes are most common.

Typically, a cured-in-place liner is delivered to the site as a hollow tube with the curable resin on the inside of the tube and the polymer backing on the outside. In some types of cured-in-place lining operations, one end of the sock is closed and the open longitudinal end of the sock is positioned adjacent one end of the pipe segment to be lined. Pressure is then applied to simultaneously evert the sock (so that the resin ends up on the outside and the backing on the inside of the sock) and force the sock into the pipe segment. Other techniques also are known for inserting the liner into the pipe, including, but not limited to pulling the liner with a cable from the downstream end of the pipe segment to be lined, attaching the liner to a pipe crawler that travels down the pipe segment pushing or pulling the liner along with it, and using water tower inversion. When such pushing or pulling techniques are used, the liner does not necessarily need to be closed at one end.

Then, if necessary, one or both ends of the liner are capped to make it air-tight for pressurization. The liner is then pressurized (e.g., from the open end or through a side valve) to cause it to expand to conform to the inner wall of the original, old pipe as well as simultaneously heated to cause an exothermic reaction to cure the liner, thereby forming a new pipe within the old pipe having almost as large a cross-section as the original pipe. The pressurization and heating can be performed by forcing hot water or steam under pressure inside the liner. The specific pressure and heating profile will, of course, depend on the particular resin composition, but an exemplary profile may require heating to between 125° F. and 200° F. at a pressure between 3 psi and 15 psi for between 1 and 1.5 hours. The pressure and heat in the pipe is monitored by pressure and temperature gauges to assure that they both stay within prescribed ranges for a sufficient duration to assure that the exothermic reaction occurs fully to properly cure the resin.

After the resin is properly cured and the liner cools down, any excess liner at one or both ends of the lined pipe segment are cut off to leave an open, newly lined pipe segment.

The resin must be maintained at a certain minimum temperature and pressure for a certain minimum period of time in order to properly cure the resin. However, Applicants have found that significant temperature variations exist along the liner so that a single temperature gauge does not provide sufficient information to confirm that the temperature is within the prescribed range along the entire pipe so to assure proper curing over the entire length of the lining, especially as the lengths of the segment become longer. If the liner is not completely cured over its full length, the entire lining operation may be compromised.

Many factors can contribute to temperature variations within the lining, such as poor heating fluid circulation. Another common cause of temperature variation within the pipe segment is because different portions of a pipe segment may pass through different environments with different thermal coefficients. For instance, one portion of a pipe segment may extend under a roadway while another portion runs under a river and yet another portion is above ground and, therefore, exposed to the cold outside air. The portion under the roadway is likely to be hotter than the portions under the river or exposed to the air because the water in the river or the outside air will act as a much more efficient heat sink (especially in cold weather) than the roadway. If the entire length of the liner has not been properly cured, the entire installation may be at risk of failing. Accordingly, it is important to assure that the entire length of the liner has been cured properly.

Various solutions for monitoring the temperature of the liner at multiple locations along its length have been offered, including placing thermocouples at multiple locations in larger pipes and inserting temperature sensing chips at multiple locations in smaller pipes to monitor the temperature at various locations within the pipe. Such solutions are costly, time consuming and/or labor intensive. They also provide temperature information only at discrete locations and distances along the pipe. Yet further, they are relatively bulky components that commonly remain in the pipe after installation and impede the flow of fluid within the pipe.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention utilizes distributed temperature sensing (DTS) to monitor the temperature continuously over the length of a cured-in-place pipe liner over time to determine if proper curing temperature and time are achieved during cured-in-place pipe lining operations. DTS is a technique involving the sending of optical signals along an optical fiber wherein the characteristics of the light that is backscattered within the fiber is indicative of the temperature of the fiber at the location within the fiber from which the light is backscattered. More particularly, an optical fiber is placed in the pipe between the original pipe and the liner running the entire length of the liner and is coupled to a DTS unit that generates pulses of light sent down the fiber and detects the backscattered light from the fiber. During curing, light pulses are sent down the fiber from one end. The characteristics of any portion of the backscattered light received at a DTS unit indicate the temperature of the optical fiber while the time delay between the sending of the light pulse and the detection of that portion of the backscatter signal is indicative of the round trip time of the light within the fiber, and thus the distance along the fiber from the DTS unit from which that particular backscatter signal portion originated. Hence, the DTS data provides the temperature in the liner continuously over the entire length of the optical fiber. Pulses may be sent down the fiber (and the backscatter signal read) at periodic time intervals to provide temperature information at time intervals of virtually any desired regularity.

DETAILED DESCRIPTION OF THE INVENTION

Figure 1:
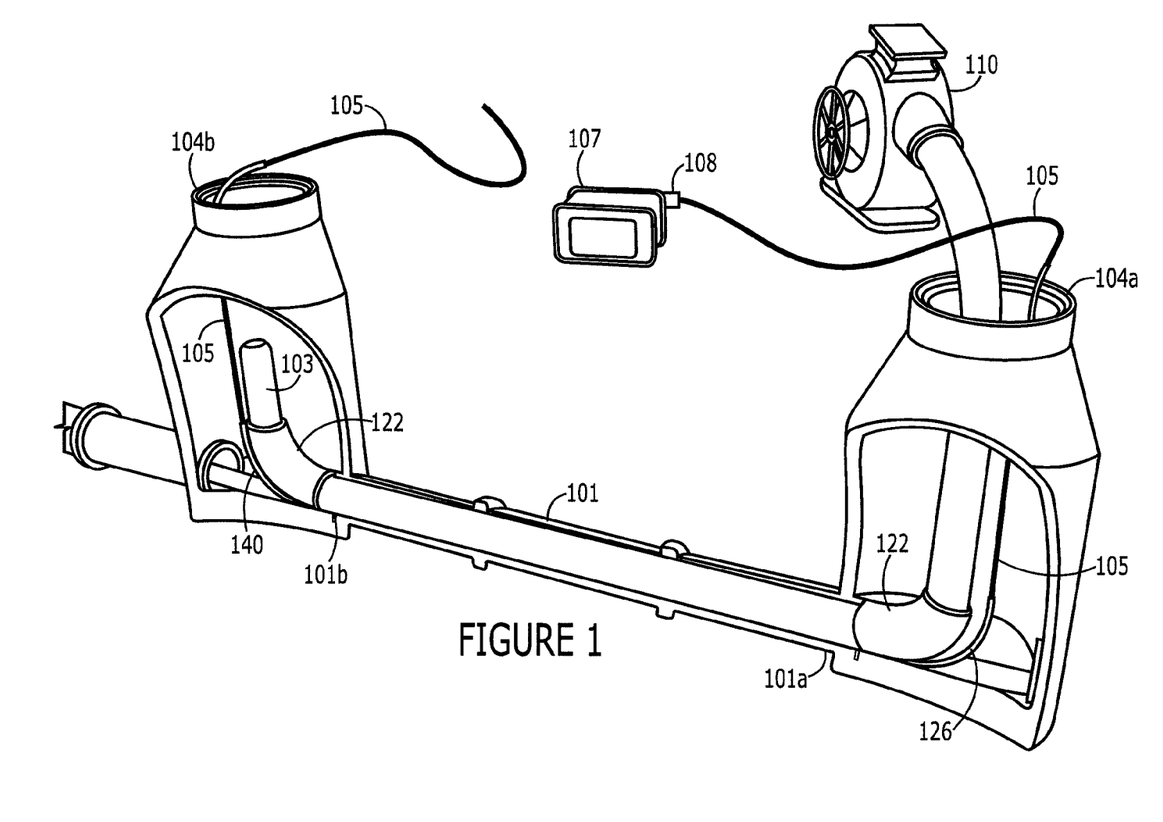
FIG. 1 is a diagram of a temperature monitoring system in accordance with the principles of one embodiment of the present invention being used in a sewer pipe being lined with a cured-in-place liner.

FIG. 1 is a schematic diagram of a pipe segment in the process of being lined according to one embodiment of the present invention and showing the various components involved in the practice of one embodiment of the present invention. FIG. 1 shows the process near an end stage so as to illustrate all of the components involved. Particularly, a segment of pipe 101, such as sewer pipe that is in need of repair, is disposed underground and is accessible only at discrete points adjacent first and second manholes 104a, 104b in the street, e.g., commonly spaced apart approximately 360-400 feet in the United States. Accordingly, a 360-400 foot long sock of cured-in-place pipe liner 103 is provided for lining the pipe 101. Before the liner 103 is placed in the pipe 101, an optical fiber cable 105 is placed in the pipe 101. In one embodiment, the optical fiber cable is longer than the actual pipe segment such that the distal end of the cable extends approximately ten meters or so from the remote end of the pipe, and there is sufficient cable at the proximate end to couple the cable 105 to a Distributed Temperature Sensing (DTS) unit 107 as described below in more detail.

The cable 105 has a connector 108 on the proximate end for coupling to the DTS unit 107. Any conventional optical connector may be used. Suitable optical connectors include, for example, single-fiber, small form factor connectors such as the LC and MU-type connectors, and single-fiber, standard form factor connectors such as the SC and FC-type connectors. Additionally, in the event multiple fibers are used (as described below), multi-fiber connectors, such as the MT-type connectors, including the MPO, MPX, and MTRJ connectors may be used.

Additionally, in certain applications, an expanded beam connector, such as those described in U.S. Pat. Nos. 7,775, 725, 7,722,261, and 7,031,567 (incorporated by reference), may be used. Such connectors tend to be more rugged and tolerant of dirt and debris in the optical coupling. That is, because the cross sectional area of the optical signal between expanded beam connectors is expanded, the disruption caused to the signal by debris of a given size between the connectors is proportionally less.

The connector 108 may be an angle polished connector (APC) or a non-APC connector depending on the application. An APC is made by polishing the end face of the fiber at an angle. By angle polishing the end of the fiber, reflections at the fiber-air interface are not coupled to the fiber core, thus minimizing backscattering at the connector coupling.

In one embodiment, the connector is pre-terminated to the fiber in a controlled factory environment. Pre-termination offers a number of benefits including, for example, a high integrity termination and precision polishing of the ferrule end face. Alternatively, the connector may be a field-installable connector. Such connectors are well known and disclosed, for example, in U.S. Pat. Nos. 7,567,743, 7,461,983 and 7,331,719 (incorporated herein by reference). Field-installable connectors generally have a clamping mechanism suitable for securing a fiber of the cable 105 to the connector while in the field. To simplify field installation, such connectors also typically include a fiber stub. One end of the fiber stub is presented at a pre-polished ferrule end face, thus avoiding the need to polish the ferrule in the field. The other end of the stub is inside the connector and is adapted to make an optical coupling with the fiber being terminated. Often optical clear gel is used to enhance the optical coupling between the fiber and the fiber stub. Accordingly, in one embodiment, after the cable 105 is pulled through the pipe, the fiber of the cable 105 is inserted into the field-installable connector such that it is optically coupled with the end of the fiber stub in the connector, and then the connector is actuated to clamp the fiber in place. Because a field installable configuration allows the connector to be installed after the fiber is pulled through the pipe 101, pulling the cable through the pipe is not impeded by the need to protect the connector.

In still another embodiment, which could be used in conjunction with either a field terminated or a pre-terminated connector, the optical connector is a secure-type connector as disclosed for example in U.S. Pat. Nos. 7,651,277, 7,325,976, and 6,960,025 (incorporated by reference). Secure connectors are configured such that they are received only in certain receptacles. Therefore, the cable 105 may be terminated with a certain secure-type connector 108, uniquely configured to connect to the DTS unit 107. Such an embodiment ensures that only the correctly engineered cable can be connected to the DTS unit, thereby avoiding the problems of mismatched cables and control units. Still other connector embodiments will be obvious to those of skill in the art in light of this disclosure.

The distal end of the cable requires no special treatment or connection and may be left bare and unterminated if desired. As mentioned above, having at least ten meters or so of extra cable at the distal end is generally preferred (although not necessary) to improve the reliability of the data. Specifically, the distal end of the fiber is subject to backscattering anomalies that do not reliably reflect the temperature of the fiber. These anomalies make it difficult to obtain accurate temperature readings from approximately the last ten meters of the fiber. Accordingly, in one embodiment, it is desirable to allow at least the last ten meters of the fiber to extend from the pipe segment 101. Alternatively, optical attenuation devices and techniques may be employed at the distal end of the cable to avoid these effects. Still other approaches for eliminating these effects will be known to those of skill in the art in light of this disclosure.

In one embodiment, before the liner 103 is placed in the pipe segment 101, the optical cable 105 is placed in the pipe extending from one end to the other, with an excess portion extending from the pipe at the remote end (as described above) and enough extra cable at the proximate end to allow the fiber to reach above ground and be coupled to a mating connector 113 on the DTS unit 107.

The optical cable 105 should be sufficiently durable and rugged for the particular environment in which is it being deployed. It should be capable of withstanding the temperature variations, pressure, tensile and shear forces involved in curing cured-in-place liners and to withstand the wear of being dragged along a pipe for a long distance. It also should be sufficiently impervious to moisture in the environment of the pipe as well as moisture from steam or water pressurization of the liner. Furthermore, a desirable characteristic of the optical cable used for this purpose is the ability of the fiber within the cable 105 to move at least slightly relative to the jacket (e.g., insulation and protective sheath). Particularly, the force placed on the cable 105 during pressurization to cause the liner 103 to conform to the inner wall of the old pipe 101 can cause the cable to stretch, shift, and/or flatten. Hence, it is desirable to use an optical cable that permits the encasement of the cable to do all of those things without damaging the optical fiber within the cable. In one embodiment, the cable is a multi-mode optical fiber cable having a core of 50 microns with a 125 micron cladding, a 900 micron thick dielectric strength layer, and a 3000 micron thick jacket. In one embodiment, the fiber is a Single-Fiber Riser Cable (LAN-90-EN) available from Corning Cable Systems LLC of Hickory, N.C., USA.

In one embodiment, a pipe crawler (not shown) of any of the types well known in the art of underground pipe inspection or maintenance may be adapted to pull the optical cable 105 from the one end 101b to the other end 101a of the pipe segment 101.

Figure 6:
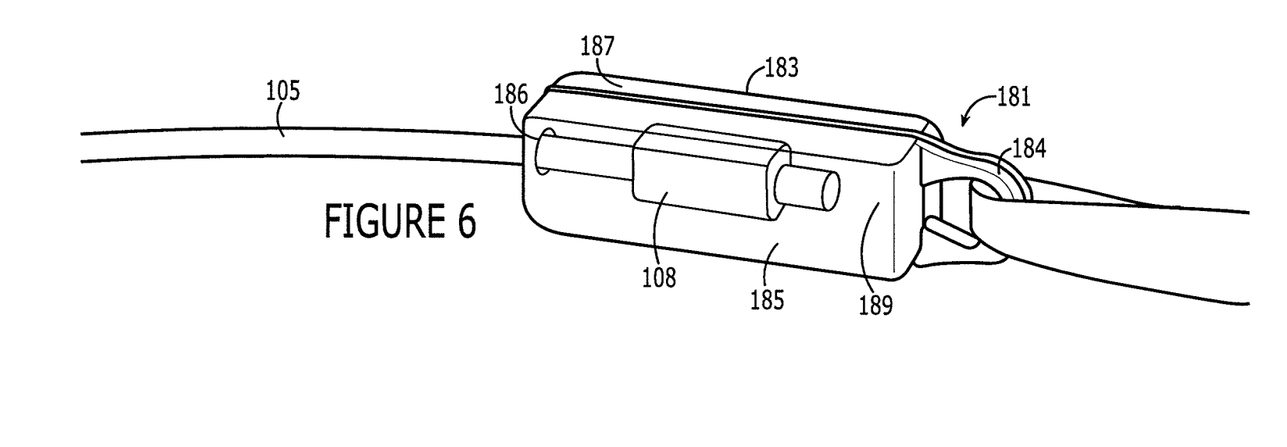
FIG. 6 is a diagram of an exemplary protecting case for the connector of the optical fiber cable during transportation along a pipe.

In one embodiment, if the cable 105 is pre-terminated with a connector, the connector 108 is placed in a protective case for protecting the connector on the end of the cable 105. Even if the cable is not pre-terminated, it may be desirable to place the end of the cable in a protective case in order to prevent scratching of the fiber and/or dust and other contamination from forming on the end face of the fiber. Various configurations of the protective case may be used within the scope of the invention. For example, FIG. 6 shows an exemplary protective case 181 of a clamshell configuration. The case 181 comprises two halves 183, 185 coupled together by a hinge 187. A mating closure mechanism (not shown), such as a mating snap and snap receiver or a mating groove and bead around the edges of the two halves 183, 185, respectively, preferably is provided to allow the case to be easily opened and snapped shut. A small gap 186 may be provided between the edges of the two halves over a short segment of the clamshell halves to allow the cable to exit the case 181 when it is snapped shut. The insides of the two halves 183, 185 are lined with a medium density, closed cellular foam 189 (shown transparent in order not to obfuscate the other elements in the drawing) that will mold itself around the connector and cable end when the case 181 is shut to protect the connector 108 and keep water or other fluids and dirt from contact with the connector. The halves 183, 185 may be formed of stainless steel or plastic. A hook 184 is provided on the case 181 so that it may be strapped or hooked to a pipe crawler. Alternatively, rather than encasing the entire connector, in one embodiment, just the delicate ferrule is protected as described, for example, in U.S. Pat. No. 7,988,367 (incorporated by reference).

In other embodiments, the cable may be pulled through the pipe in the other direction so that the other, unterminated end of the cable passes through the pipe. In such cases, the unterminated end of the cable may be pulled without protection or also may be placed within a protective case, such as case 181.

It should also be appreciated that in embodiments in which a field-installable connector (as described above) is terminated to the cable after the cable is pulled through the pipe, no protection is needed.

In the illustrated embodiment, the liner is introduced into the pipe from first manhole 104a and the cable is introduced from the second manhole 104b. However, it should be understood that the directions are merely exemplary and that both the pipe and cable can be inserted from either end, and they can be inserted from the same end or from different ends.

Figure 3:
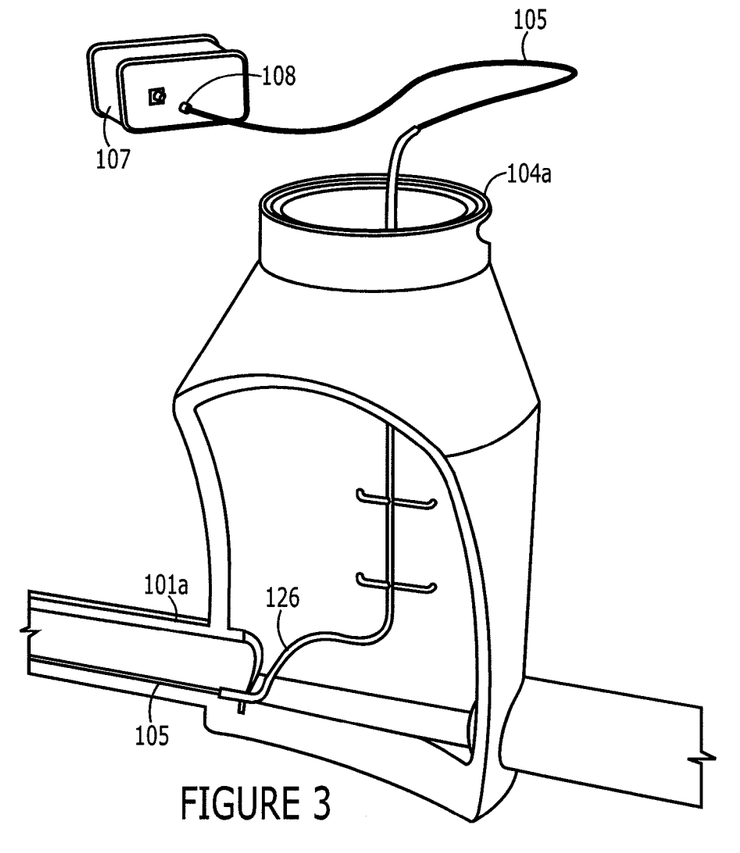
FIG. 3 is a diagram of the equipment at one end of a pipe segment being lined in accordance with the principles of one embodiment of the present invention.

FIG. 3 is a close up view of the first manhole 104a at a stage after the cable 105 has been run through the pipe segment 101, but before beginning to install the liner 103. With reference to FIG. 3, when the crawler reaches the first end 101a of the pipe segment 101, the cable is placed through a protective tube 126 that runs from the bottom of the end 101a of the pipe segment 101 up through the first manhole 104a. The purpose of the tube 126 is to protect the cable at the eversion station (i.e., the first manhole 104a from which the liner will be installed in the pipe segment 101). The cable 105 may be pushed through the tube 126 from the bottom to the top manually by a worker in the manhole. Alternately, a wire (not shown) may be dropped through the tube 126 from the top and attached to the hook 184 of the protective case 181 and used to pull the cable 105 through the tube 126. Alternately, the protective case 181 may be removed first and the wire connected directly to the connector 108 for pulling through the tube 126. In yet another embodiment as illustrated in FIG. 9, the protective tube 126a may be a split cylinder, having a longitudinal slit 221 through which the fiber may be inserted into the tube 126a laterally, rather than having to run the fiber through the tube longitudinally.

The tube 126 is rigid and serves the purpose of holding the cable 105 at the bottom of the pipe segment 101 because the eversion process of the liner 103 might otherwise cause the cable 105 to move away from the bottom of the pipe segment 101 and/or may stretch or break the optical fiber. The tube may extend only a short distance near where the liner 103 will curve to enter the pipe segment 101 (where damage is most likely to occur during the liner eversion process), as illustrated in FIG. 1, or may extend all the way up through the manhole opening to further protect the cable 105 from possible damage as it is being advanced up through the manhole, as illustrated in FIG. 3.

In one embodiment, only a single length of optical cable 105 is used and is disposed at the bottom of the pipe 101. Typically, this will be adequate insofar as most insufficient curing occurs along a certain longitudinal segment of the pipe, rather than a radial segment of the pipe. That is, if the liner has reached the proper temperature for the proper amount of time in any given longitudinal point along the liner at the bottom radial portion of the pipe, then it is quite likely that the temperature is at least that temperature and likely higher at the top radial portion of the pipe at the same longitudinal segment. In fact, it is likely that the temperature increases slightly with height within the pipe since heat tends to rise. Thus, it is advantageous to place the cable at the bottom of the pipe, as illustrated in this exemplary embodiment. Such an embodiment provides a highly effective, yet economical approach to monitor a curing liner.

However, if the liner is being installed in a pipe for which that assumption is not likely to be accurate, multiple parallel optical cables may be disposed along the length of the pipe at different radial positions around the pipe. For instance four optical cables may be disposed at 90° spacing around the inner wall of the pipe. In such cases, the optical cables may be coated with a sticky substance or even an epoxy that will cause them to stick to the side of the pipe since the natural tendency of the cable will be to fall to the lowest point in the pipe. Alternately, the cable may be placed on an adhesive tape that can be pressed against the wall of the pipe. In yet other embodiments, the one or more optical cables may be fabricated directly into or on the liner. However, depending on the diameter of the pipe being lined typically, the liner may have to undergo a rather tight curve as it is being inverted during installation. Accordingly, it may be necessary to use an optical cable capable of withstanding small radius curvature without breaking. In yet other embodiments, the cable may be installed simultaneously with the installation of the liner, such as by dragging the cable along with the liner.

Figure 2:
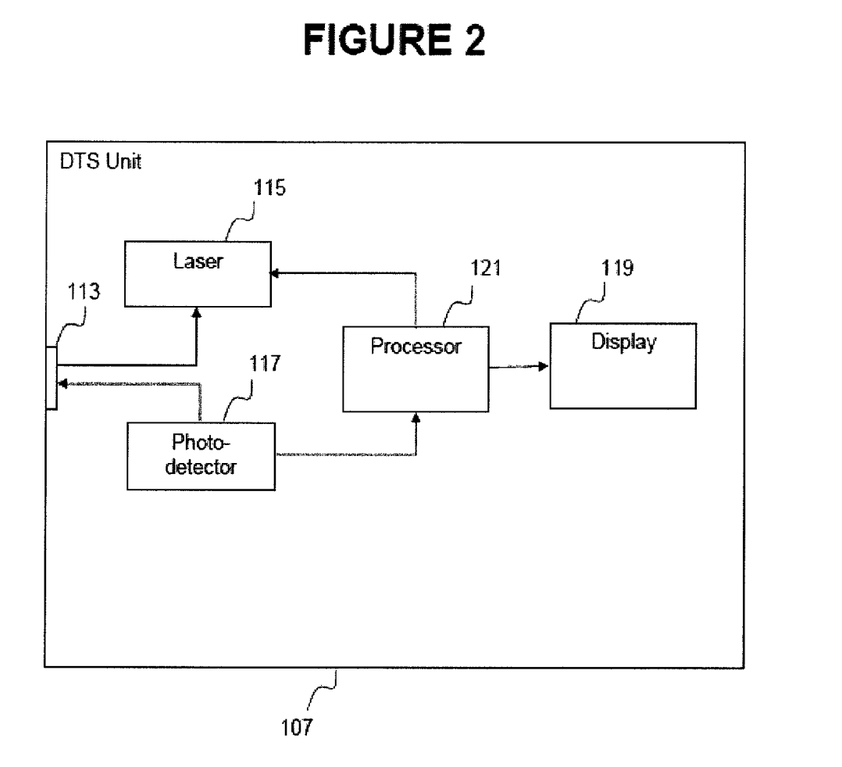
FIG. 2 is a functional block diagram of a DTS unit in accordance with the principles of one embodiment of the present invention.

Next, in one embodiment, the clamshell case 181 is opened and the connector 108 is coupled to the mating connector 113 of the DTS unit 107. DTS units are well known and will not be described in detail herein. However, FIG. 2 is a block diagram showing the main components of a DTS unit 107. FIG. 2 is merely a functional representation of a typical DTS unit and the individual functional blocks therein are for illustrative purposes only and do not necessarily correspond to different physical components. The unit 107 includes the aforementioned connector 113 for coupling to a mating connector on the end of the optical cable, a light source 115 for generating light pulses coupled into the cable 105 through the mating connectors 108, 113, one or more light detectors 117 for detecting backscattered light from the cable 105, and a microprocessor 121 for processing the backscatter light data to generate information as to temperature and distance data within the pipe. Further, the unit 107 includes means 119 for presenting the temperature and distance data to a user, such as a display, printer, or at least an output port, such as a USB, wireless transmitter, or other computer data port that allows the unit 107 to be coupled to a display or laptop computer for displaying, recording or transmitting the temperature data. The light source may be, for example, a semiconductor laser and the light detector may be, for example, a photodetector.

Referring back to FIG. 1, next, the liner 103 is disposed into the pipe segment in accordance with any known or future developed liner installation process. In one embodiment, the liner disposed in the pipe using an eversion process as shown in FIG. 1. In this example, two guides 122 are placed at the two ends 101a, 101b of the pipe segment 101, respectively, to guide the liner 103 into the pipe at the eversion end 101a and to guide the liner 103 out and up toward the second manhole 104b at the opposite end 101b. The guides 122 are 90° bend guides in this example.

Figure 4:
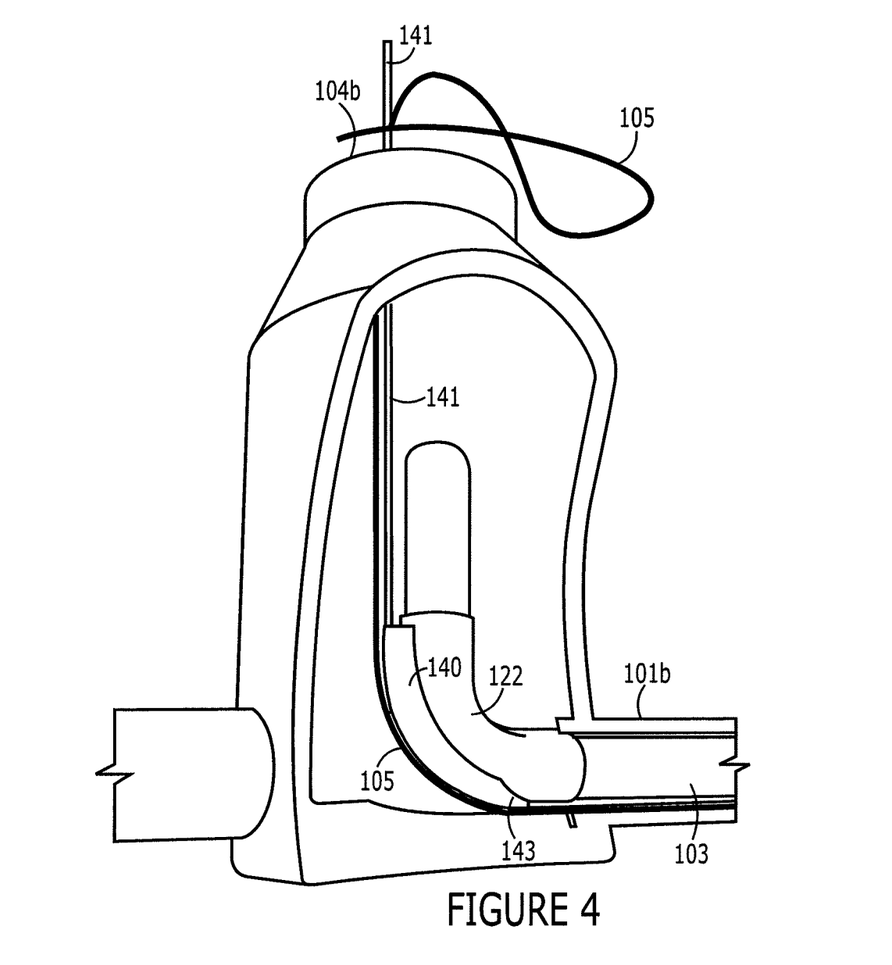
FIG. 4 is diagram of the equipment at the other end of a pipe segment being lined in accordance with the principles of one embodiment of the present invention.

With reference to FIG. 4, which is a close up view of the second manhole 104b, in one embodiment, a shoe 140 may be positioned under the guide 122 at the distal end 101b of the pipe segment from the eversion unit 110 to even further protect the optical cable 105 and keep it held down at the bottom of the pipe segment. The shoe 140 may be formed of a semi-tubular, fiberglass piece. The outer surface of the shoe, at least near its bottom end 143, is lined with a high friction material, such as a closed cellular foam of medium density, to provide friction for holding the cable in place at the distal end 101b of the pipe segment. More particularly, the shoe 126 is forced under the guide 122 between the guide 122 and the cable 105 to better hold the cable 105 in position at the bottom of the pipe segment 101. Some cured-in-place pipe liner installers do not use guides such as guides 122. In such cases, the use of shoe 126 is highly recommended (although not necessary) and will serve the additional function of guiding the liner up toward the manhole opening. The shoe may be disposed at the end of a telescopic pole 141 so that it may be forced into place from a distance, such as from outside of the manhole. In other embodiments, a tube such as tube 126 shown in FIG. 3 may be used instead at the distal end.

As the liner 103 is everted and advanced along the pipe segment 101, the optical cable 105 is trapped between the resin-side of the liner 103 and the bottom of the inner wall of the pipe 101.

As previously noted, after the liner 103 has been fully inserted into the pipe 101 and everted, with the optical cable 105 trapped between the liner 103 and the inner wall of the pipe 101, the liner 103 is coupled to device 110 for curing the resin. For instance, this is commonly done by capping one end of the liner 103 and coupling the other end to a heat and pressure device 110 that forces a pressurized and heated liquid or gas, such as water or steam, into the liner 103 to cause the liner to expand and press against the inner wall of the pipe and be cured in that position. In some embodiments, the liner may already be coupled to the heating and pressurizing device, since, in some embodiments, the device that inserts and inverts the liner is the same device that heats and pressurizes the liner. In some embodiment, the distal end of the liner 103 may already be closed off (and, thus, not require an additional cap).

While the curing process is being performed, the DTS unit 107 is activated to send light pulses down the fiber and analyze the backscattered light data indicative of the temperature of the fiber continuously over its length. The temperature of the fiber, of course, should correlate quite closely to the temperature of the pipe liner in which it is essentially embedded. Software processes and analyzes the data to convert it into time, distance, and temperature data according to well-understood DTS technology principles that will not be described herein in detail. However, briefly described, Distributed Temperature Sensing systems (DTS) are optoelectronic devices that measure temperature by means of optical fibers functioning as linear sensors. Temperatures are measured along the entire length of the optical cable, not at discrete points, but as a continuous profile. Temperatures may be measured with great precision over substantial distances. For example, a typical DTS system can measure the temperature to a spatial resolution of approximately 0.5 meters with accuracy to within ±1° C. at a resolution of 0.01° C. Measurement distances of greater than 30 km can be monitored and some specialized systems can provide even tighter spatial resolutions.

DTS relies on the phenomenon known as the Raman Effect in optical fibers. More specifically, physical conditions, such as temperature, pressure, and tensile forces, can affect glass fibers and locally change the characteristics of light transmission in the fiber. As a result of the damping of the light in the quartz glass fiber through scattering, the location of an external physical effect, such as temperature, pressure or tensile stress can be derived from the characteristic of backscattered light in the fiber. Thus, the characteristics of the light transmission in the optical fiber can be observed as an indicator of, for instance, temperature. Hence, an optical fiber may be employed as a linear temperature sensor. Optical fibers are commonly formed of doped quartz glass. Quartz glass is a form of silicon dioxide (SiO2) with amorphous solid structure. Thermal effects induce lattice oscillations within the solid. When light falls onto these thermally excited molecular oscillations, an interaction occurs between the light particles (photons) and the electrons of the molecule. Light scattering, also known as Raman scattering, occurs in the optical fiber. The scattered light undergoes a spectral shift relative to the incident light by an amount dependent on the resonance frequency of the lattice oscillation. The light backscattered in the fiber to the input end therefore contains three different spectral shares: namely, the Rayleigh scattering with the wavelength of the laser source used, the Stokes line components from photons shifted to longer wavelength (lower frequency), and the anti-Stokes line components with photons shifted to shorter wavelength (higher frequency) than the Rayleigh scattering.

The intensity of the anti-Stokes band is temperature-dependent, while the so-called Stokes band is practically independent of temperature. Hence, the local temperature of the optical fiber is derived from the ratio of the anti-Stokes and Stokes light intensities.

There are two general ways to measure in DTS, namely, Optical Time Domain Reflectometry (OTDR) and Optical Frequency Domain Reflectometry (OFDR).

The basic principle for OTDR is similar to the round trip delay measurement used for radar. Essentially a narrow laser pulse is sent into a fiber and the backscattered light is detected and analyzed. The time it takes any portion of the backscattered light signal from the pulse to return to the detection unit dictates the distance to the portion of the optical fiber that generated that signal portion. The characteristics of that light are indicative of the temperature at that point in the optical fiber.

According to the Optical Frequency Domain Reflectometry (OFDR) technique of DTS, the backscattered light signal is detected over a measurement time period as a function of frequency in a complex fashion, and then subjected to Fourier transformation to derive temperature information as a function of distance along the fiber. The essential principles of OFDR technology are the quasi-continuous wave mode employed by the laser and the narrow-band detection of the optical backscatter signal.

As noted above, DTS systems are presently available on the market that are capable of operating over extremely long distances with a spatial resolution of approximately 0.5 meters and greater with accuracy to within ±1° C. and at virtually any temporal resolution. Such resolutions far exceed the reasonably necessary resolutions for the present application. Accordingly, lower-end commercially available DTS devices may be adapted for use in connection with the present invention, thus allowing the construction of DTS units for the present invention that are relatively low-cost; making the present solution very cost-effective. In one embodiment of the invention, the DTS unit 107 has a single optical channel (i.e., it can be used with one optical fiber), a temperature resolution of 1.0° C. and a spatial resolution of 0.5 meters. It is adapted for use with multimode graded index 50/125 µm or 62.5/125 µm optical fibers. Measurements may be taken at any reasonable time intervals. Thus, if cure times are on the order of 1-4 hours, reasonable time intervals for temperature measurements may be 1 to 5 minutes or even greater. Alternately, for smaller liners with quicker cures or just to collect more data, samples may be taken as often as every 10 seconds or less.

The temperature data may be reported in any desired form, such as text, graph, or chart. The software may be designed to provide alerts (e.g., sounds, graphical symbols, etc.) as to certain conditions. For instance, an alert may be issued when the temperature detected throughout the entire pipe segment reaches the minimum curing temperature. Also, it may display a running timer showing the duration that the temperature has been continuously above the minimum recommended cure temperatures. Other alerts may be issued if and when, for example, the temperature dips below the minimum required temperature for cure anywhere in the pipe segment, and/or the temperature has remained above the minimum recommended cure temperature for the recommended cure duration individually for each and every length segment of the liner.

The invention further comprises software specifically adapted for the use of DTS in connection with the curing of cured-in-place liners as discussed herein, including preconfigured Graphical User Interfaces (GUIs) for inputting data pertinent to use in connection with cured-in-place liners, data storage capabilities, and GUIs for displaying relevant data to operators. In one embodiment, the software is adapted to be loaded and run on a conventional computer substantially independently of the DTS software other than receiving the temperature data from the DTS software and can be used in association with multiple different commercially available DTS systems. The software package allows the operator to view data in a number of different operator-selectable ways. The operator may switch views at any time, including during a curing operation.

Figure 5:
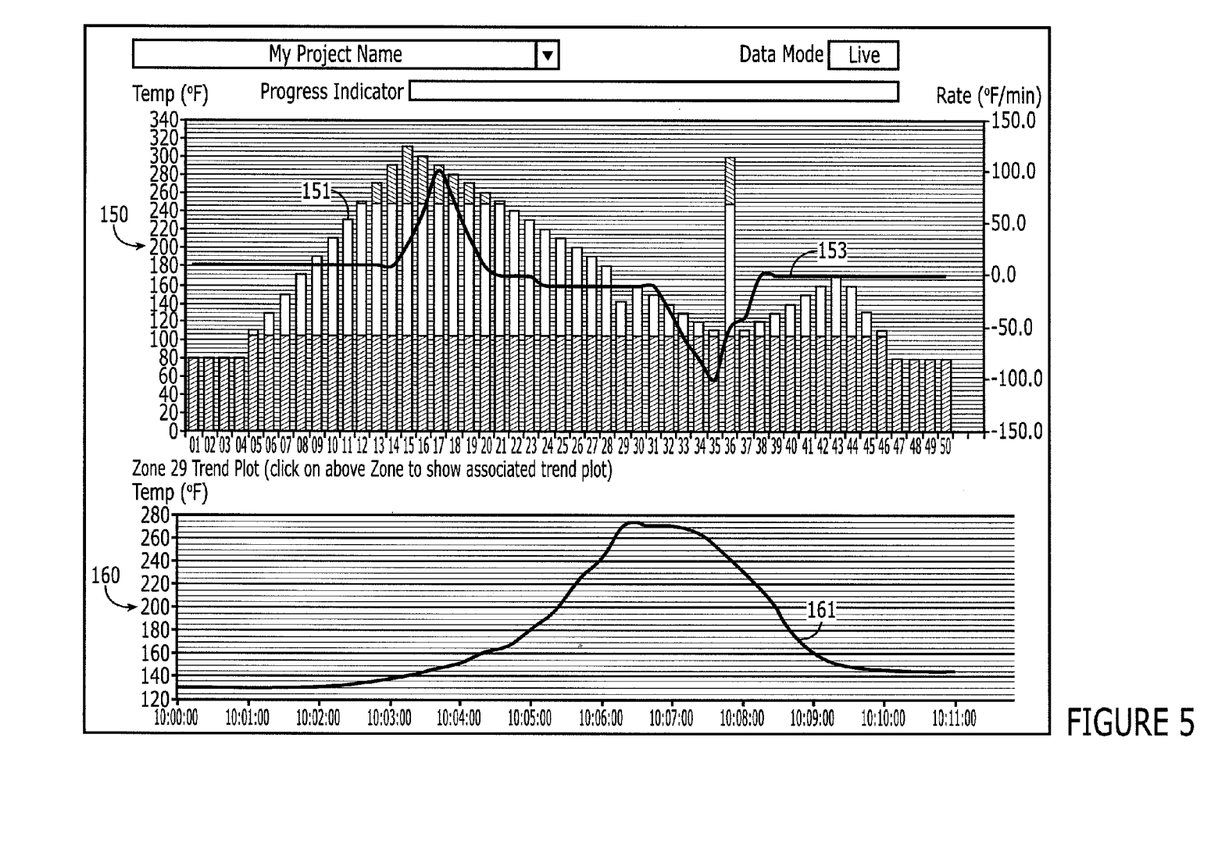
FIG. 5 shows an exemplary display screen for displaying DTS information in accordance with the principles of one embodiment of the present invention.

FIG. 5 is an exemplary graphical user interface showing one way in which temperature data may be efficiently presented to the user. This presentation includes two separate graphs 150 and 160 that may be shown simultaneously or separately. The first graph 150 simultaneously shows two different types of information. The graph shows position along the pipe segment along the horizontal axis and temperature along the left vertical axis and rate of temperature change along the right vertical axis. Preferably, position on the horizontal axis may optionally be displayed at the user's choice as actual distance along the fiber or as a segment number. The embodiment shown in FIG. 5 illustrates segment numbers. With respect to the first type of information shown in graph 150, each bar 151 represents the current temperature (with reference to the left-hand vertical graph axis) at the corresponding 0.5 meter long segment of the pipe (with reference to the horizontal graph axis). With respect to the second type of data shown in graph 150, line 153 shows the current rate of temperature change (with reference to the left-hand vertical graph axis) as a function of distance along the pipe (the horizontal graph axis). In addition, progress indicator 165 at the top indicates how long the entire liner (i.e., all length segments) has been above the minimum desired cure temperature (cure dwell time). This is displayed as a bar 166 that increases in length within the progress indicator 165 as a function of time. The display software may be configured so that the full length of the progress indicator 165 corresponds to the desired minimum cure time, such that, when the line 166 reaches the end (the right side) of the progress indicator 165, it indicates that the cure is complete (i.e., that the entire liner has been above the minimum cure temperature for the minimum cure period.

Another feature in the graphical user interface of FIG. 5 is color or pattern coding of the bars 151 representing the temperatures of the various segments. For instance, as shown, note that the portion of each bar (e.g., portion 151*a*) that is above the minimum cure temperature is a different color or pattern than the portion of the bar (e.g., portion 151*b*) below the minimum temperature, thus making it easy to readily appreciate when a segment is above the minimum cure temperature. In addition, in some liner installations, there may be maximum cure temperatures that should not be exceeded. This is also demonstrated in the graphical user interface of FIG. 5, in which any portion of a bar above the maximum temperature (e.g., portion 151*c*) is a different color than the color of the bar that is between the minimum and maximum temperatures. Alternately or additionally, a visible line may be drawn across the graph 150 corresponding to the minimum cure temperature and/or maximum cure temperature.

The second graph 160 shows temperature (line 161) as defined along the vertical axis at a selected one of the length segments along the pipe, segment (or zone) 29 in this example, as a function of time (as defined along the horizontal axis). In the illustrated embodiment, graph 160 for any length segment can be called up for viewing from graph 150 by clicking on the bar 151 corresponding to particular length segment of the pipe of interest. In one embodiment, the two graphs 150 and 160 are shown simultaneously.

In one embodiment of the invention, the software can display data in a number of additional user-selectable forms. For instance, in another presentation style, a graph may be presented illustrating temperature as a function of time. For instance, a line representing the minimum temperature anywhere in the pipe may be plotted on a graph in which the vertical axis corresponds to temperature and the horizontal axis represents time. A straight vertical line of a different color may be shown corresponding to the recommended minimum temperature for curing so that the user can readily confirm that the temperature throughout the entire length of the pipe segment remains above the recommended minimum temperature for the desired duration for cure.

In one embodiment, a commercially available DTS device may be combined with custom software to generate and display data in one or more forms that are particularly useful for pipe lining applications, including one or more of the data display modes discussed immediately above.

Figure 7:
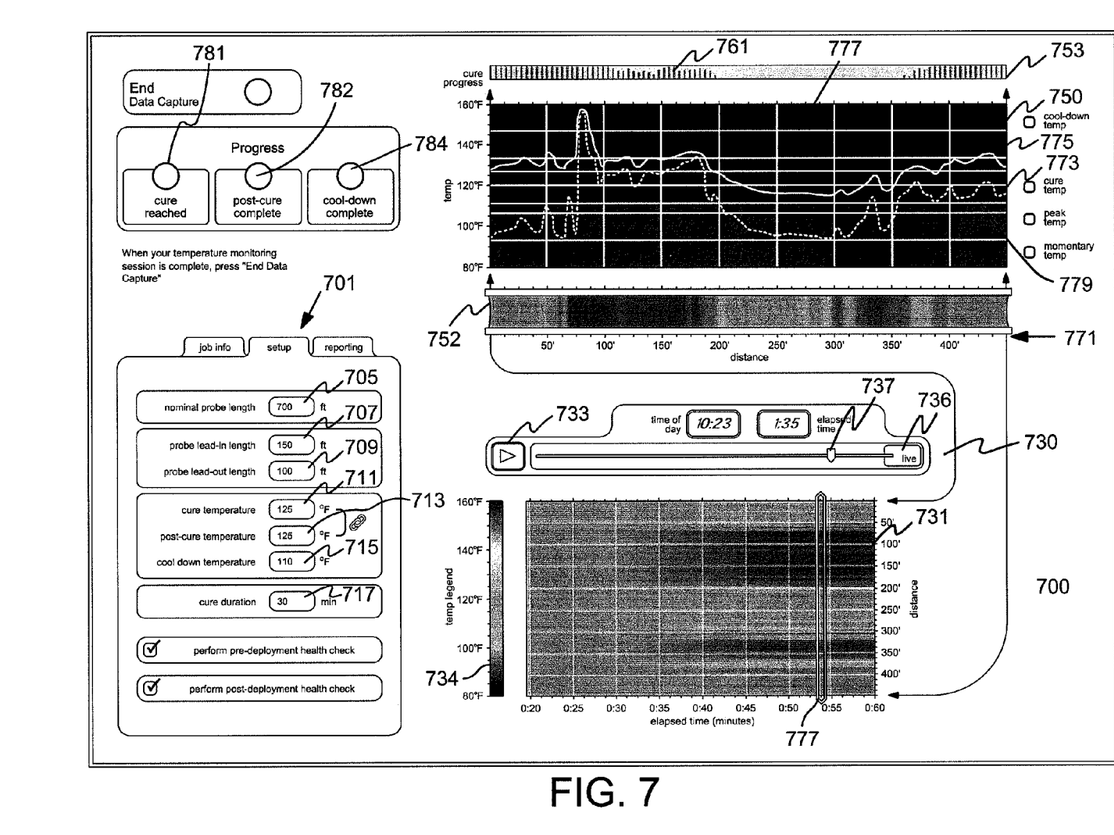
FIG. 7 shows an exemplary display screen for displaying DTS information in accordance with another exemplary embodiment of the invention.

The software is user configurable and allows an operator to selectively input the various data desirable to useful operation of the invention. This can be accomplished through a suitable input graphical user interface. FIG. 7, for instance, illustrates one exemplary GUI in which the operator may enter relevant data for a cure procedure in an operator input GUI 701. This particular GUI also displays the time, distance, and temperature data during the cure in a separate area of the same screen 700. However, in other embodiments, an operator input GUI may be displayed on a separate screen from the cure data.

In one embodiment, GUI 701 includes (1) a nominal probe length input box 705, in which the operator may specify the length of the fiber, (2) a probe lead in length input box 707, in which the operator inputs the length of the fiber at the leading end that is not within the cure zone, and (3) a probe lead out length input box 709, in which the operator inputs the length of the fiber at the distal end that is not within the cure zone. Recall that data from about the last 10 meters of the fiber is unreliable and so one should leave at least 10 meters of fiber lead out past the end of the cured-in-place liner. This data is useful so the system can identify those length segments of the fiber that are not within the pipe (and therefore not relevant.

Other data that the operator should input include, for instance, required minimum cure time 717 and required minimum cure temperature 711. The post cure temperature input box 713 is optional and may be left blank. However, with respect to some cured-in-place liners, the liner must be brought up to a first temperature at the beginning of cure, but then can continue to be cured at a second, lower temperature, in which case the proper value should be entered in the post cure temperature box.

If relevant, a maximum cure temperature input box may also be provided (not shown).

In many operations, cool down of the liner after cure is completed should meet certain requirements. Particularly, too fast of a cool down can cause rapid shrinkage of the liner, which can lead to cracking of the liner, particularly if pieces of the liner have expanded into cracks and/or grooves in the pipe that will prevent the liner from moving longitudinally. Hence, the software also allows the operator to input a cool down stop temperature 713, e.g., the temperature to which cool down must be controlled, and after which the heating apparatus may be turned off because cool down can occur more rapidly and/or uncontrolled below that temperature without fear of adverse effect.

Alternately or additionally, an input GUI may allow an operator to enter a desired maximum cool down rate (not shown). The software may, for instance, allow the operator to enter the maximum cool down rate via a GUI in which the operator enters two numbers, namely, (1) a number of degrees per (2) a unit of time (e.g. "10° C." per "15 minutes").

All of the aforementioned input data can be used by the system to generate more useful output data to the operator to assist in observation of the cure process. Such output data may include alerts generated when limits such as minimum cure temperature, minimum cure time, and cool down temperature are reached or neared, references on displays for easy visual identification of important limits, etc.

In the exemplary GUI 700 of FIG. 7, the display includes a plurality of alerts, such as a first, "Cure Reached" progress indicator 781 that indicates when all of the pertinent length segments of the liner (e.g., the segments that are within the pipe as input by the operator during set-up) have reached minimum cure temperature. The indicator may be any reasonable icon. For instance, it may be a circle, as illustrated, that changes color upon the indicated event. In the embodiment illustrated in the graphical user interface of FIG. 7, the indicator 181 emulates a warning light and comprises a circle that starts out black and turns green when the stated condition is metcolor, e.g., when the cure temperature has been reached in all segments.

A second, "Post-Cure Complete" progress indicator 782 indicates when all of the segments have been above the minimum cure temperature (and below the maximum cure temperature, if applicable) for the preset minimum cure time.

A third, "Cool-Down Complete" progress indicator 784 indicates when cool down has been completed (e.g., the cool stop temperature has been reached in all segments and, if applicable, the maximum cool down rate has not been exceeded).

FIG. 7 further includes useful displays of the time, temperature, and distance/segment information. For instance, in GUI portion 750, distance (or segment) is represented on the horizontal axis 771 and temperature is represented on the vertical axis 172, just as in the GUI of FIG. 5. Portion 50 includes a first graph 751 displaying a plurality of different plot lines of different colors simultaneously display a plethora of information. In one embodiment as shown, the area beneath each plot line is filled with the color corresponding to that line, but with some level of transparency so as not to obscure any other plot lines in the graph. This configuration tends to make the different plots more easily visually identified and segregated in the viewers mind.

In any event, a first line 773 of a first color represents the momentary (or instantaneous temperature), a second line 775 of a second color represents the peak temperature reached, a third line 777 of a third color represents the minimum cure temperature (essentially a horizontal line), and a fourth line 779 of a fourth color representing the cool down stop temperature (another horizontal line).

Above the main graph 751 is a bar graph 753 that displays cure time in a useful manner. Specifically, bar graph 753 includes a vertical bar 761 corresponding to each distance segment. The bars 761 visually display how long the corresponding length segment has been continuously above the minimum cure temperature. Specifically, in this embodiment, the bar grows upwardly in length as a function of time above minimum cure temperature until a maximum length corresponding to the minimum cure time. Furthermore, in one embodiment, the bar changes color, e.g., grey to green, upon reaching the minimum cure time.

In an alternate embodiment, cure dwell time information may be provided directly within the distance versus temperature graph 751 (or 150 in FIG. 5) by means of color. More particularly, the duration for which a given distance segment has been above the minimum cure temperature (or, alternately, between the minimum and maximum cure temperatures) is represented by the color of the bar or vertical segment corresponding to a given distance segment (e.g., bars 151 in FIG. 5). In one embodiment, the color of the bar or vertical segment changes gradually with the cure time. In one embodiment, the color may change gradually (e.g., from red to yellow) until the minimum cure time is reached, at which time the color changes more discreetly or abruptly to a color distinctively different from the other colors used (e.g., green). In accordance with one sub-embodiment of this embodiment, the color may remain constant for all temperatures above the minimum cure temperature (or between the minimum and maximum cure temperatures).

Alternately, when the minimum cure time is reached for a given segment, text or another graphical representation can be superimposed over that bar, such as the word "CURED" or "DONE."

Below main graph 751 is another graph 731 that displays temperature, time, and distance data in yet another useful fashion. Specifically, in graph 731, time (not time above cure temperature, but just time) is represented on the horizontal axis and distance/segment is represented on the vertical axis. Temperature is represented by color. Key 734 shows what colors correspond to what temperatures in graph 731.

In accordance with another feature, a time bar 730 allows the operator to view instantaneous (i.e., live) data or to select any past instant in time within graph 731 for more detailed display in another graph 752. More particularly, graph 752 takes a vertical time slice of graph 731 and displays it sideways above in graph 752 just below main graph 751 using the same horizontal distance/segment axis 771 as main graph 751. Hence, when live is selected, graph 752 shows essentially the same information as plot line 771 in the main graph 751 and on the same distance scale, except using color to represent temperature, rather than the vertical axis.

The operator can select to view the live, instantaneous data in graph 752 by clicking on the Live button 736 or can choose to display any other past instant in time in graph 752 by sliding the time selection indicator 737 to any desired time within time bar 730. Icon 739 may be displayed within graph 731 to show the particular time slice that has been selected for display in graph 752. A Play button 733 allows an operator to view graph 731 over time.

As previously noted, once the entire liner has been cured at the proper temperature for the proper duration, then cool down must be controlled. The same or similar displays and display concepts also may be applied with respect to cool down. For example, the hour glass or progression bar above each segment bar concept can be used to graphically display the ratio of time between the start of cool down and that segment reaching the cool down stop temperature. In addition, the distance versus temperature graphs of FIG. 5 or 7 may continue to be displayed during cool down to display the relevant cool down data, such as momentary temperature, cool down stop temperature, duration, etc., including the use of color to represent time. In an alternate embodiment, the display may generate a single plot showing rate of cooling (i.e., the derivative of temperature). To assure controlled cooling, all points on this curve must remain below a horizontal threshold line (the maximum allowed cooling rate).

In addition, audible, visual, or other warnings may be issued to indicate certain undesirable conditions or, more preferably, the approach of certain undesirable conditions so that corrective actions may be taken by the operator before it is too late. Such conditions may include, for instance a warning when the maximum cure temperature, if set, has been exceeded in any segment or a warning when one or more segments dips below the minimum cure temperature before the specified cure duration has been met for that segment. In one embodiment, such warnings are issued when a given parameter approaches within a predetermined range of a fail condition (rather than upon the actual occurrence of the fail condition). In this manner, the operator is alerted to the potential for a fail condition before it occurs, while it is still possible to take corrective action. For instance, merely as an example, if maximum cool down rate is 10° per 15 minutes, then a warning may be issued when a segment exceeds a cool down rate of greater than 8° per 15 minutes.

In accordance with another aspect of the invention, the information gathering and display software—which includes the software for storing the time and temperature data, for generating the various graphical user interfaces, for inputting data to the system, and for displaying data—is separate and independent from the DTS software. In this manner, it can be used with multiple different DTS systems by employing a multiplicity of suitable APIs (application program interfaces), each adapted to interface with a different commercially available DTS system.

In addition, the software is designed to interface and exchange data, through suitable APIs, to various different commercially available underground asset management software systems, such as CityWorks available from Azteca Systems, Inc., Maximo available from IBM, Inc., and Hansen available from Infor Global Solutions. For instance, the software on the present invention can upload and pre-populate data such as asset ID, asset history, location, etc. In the opposite direction, the software of one embodiment of the present invention may transfer recorded information about the pipe cure directly into underground management asset software databases.

In accordance with another aspect, the software of one embodiment of the present invention is configured to export data in widely used, open formats, such as CSV and XML.

In yet other embodiments, the interface software may be further adapted to interface directly to the heating and pressurization apparatus so that the time and temperature parameters can automatically be maintained within desired ranges.

Once the liner is installed and cured, the excess optical cable 105 and liner 103 protruding from both ends of the pipe segment 101 are cut off and discarded. The remainder of the cable 105 within the pipe simply becomes part of the installation. The cable is a simple optical fiber cable with no active components or moving parts and, thus, is of negligible expense. Furthermore, underground optical fiber is increasingly being used for communication purposes in CATV (Community Antenna Television) and other telecom systems. Accordingly, the optical fiber may be re-used after the liner is installed either immediately or at a later time as communication cable for a communications system. If and when the optical cable must be routed up through a manhole from the bottom of the pipe, the cable should be routed so as not to interfere with the flow of fluid through the pipe. For instance, the cable may be glued, taped, clamped, or otherwise attached to the bottom and/or side wall of the manhole in order to keep it out of the flow in the manhole. In small diameter pipes and other situations where the existence of the fiber between the old pipe and the new pipe/liner may adversely affect flow of fluid within the pipe, it may be desirable to grind a groove in the pipe prior to lining and embed the fiber in the groove.

Also, if later use of the cable as a communication cable is likely or possible, then it may be desirable to, instead of cutting the cable adjacent the opposite ends of the liner, to leave excess cable at one or both ends in the manhole stack(s). The excess cable should be spooled and attached in a place out of the path of fluid in the liner so as not to disturb flow within the new pipe.

In some embodiments, it may be desirable to install other cables while installing the optical cable at little or no extra cost. For instance, electrical cable may be installed along with the optical cable, the electrical cable being used for communication or electrical transmission and/or for pipe location purposes. Particularly, it is known technology to locate underground electrical cable by transmitting low-power radio frequency signals on the electrical cable and detecting the radio waves emitted by the underground wire with a portable above-ground radio receiver that can be walked or driven above the cable. Typically, the radio frequency signals are of sufficiently low power that the radio receiver can detect the emitted radio signals only when it is positioned directly above or very close to the underground cable. Hence, one can trace the underground cable by following it with the radio receiver. In some embodiments, the electrical cable may comprise a copper filament or sheath incorporated directly within the insulation or sheath of the optical cable.

The present invention allows the observation of the temperature of a cured-in-place pipe liner over its entire length so that installers can be certain that the entire liner has been properly cured. The present invention will reduce environmental pollution because it will result in fewer leaking or structurally failed utility pipes (sewer, gas, etc.) resulting from improperly cured pipes. It is further environmentally friendly because it will substantially decrease energy usage and installation times for such installations. Particularly, in the past, because it was difficult to be certain when the entire liner had been properly cured, it was standard practice to cure for longer times at higher temperatures in order to better assure that the entire liner had properly cured. However, with the present invention, installers will know through direct observation over its entire length when the entire liner has been properly cured, i.e., has been above the predetermined minimum temperature for the predetermined minimum period of time and, thus, will no longer need to use excessive temperatures and cure times just to be certain of proper curing in the absence of actual, accurate temperature and time data over the entire length of the liner.

The invention also is superior to previous systems because the optical cable is very narrow in diameter and is disposed outside of the lined pipe, and therefore does not impede flow within the pipe.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of curing a cured-in-place liner within a tube, the tube having a first longitudinal end, a second longitudinal end, and a length between the first and second longitudinal ends, the method comprising:
   placing a single optical fiber within the tube extending longitudinally from at least the first end to the second end of the tube, the optical fiber having a first longitudinal end, a second longitudinal end, and a length between the first and second longitudinal ends;
   positioning a liner within the tube extending longitudinally from the first end to the second end of the tube, the liner comprising a curable material for lining the tube;
   coupling the first longitudinal end of the optical fiber to a distributed temperature sensing unit;
   heating the liner to cure the curable material;
   measuring the temperature of the optical fiber along its length via distributed temperature sensing using the distributed temperature sensing unit with DTS software to generate temperature and time data;
   gathering the temperature and time data;
   transmitting the temperature and time data to an underground asset management software system; and
   wherein gathering and transmitting the temperature and time data is performed using an interface having at least one application grogram interface, independent from said DTS software, and wherein said interface comprises a plurality of application program interfaces for interfacing with a plurality of different distributed temperature sensing units.

2. The method of claim 1 wherein the placing of the single optical fiber comprises placing the fiber along the bottom of the tube.

3. The method of claim 1 further comprising:
   generating a display of the temperature of the optical fiber as a function of distance segments along the length of the fiber.

4. The method of claim 3 wherein the generating a display comprises displaying a graph plotting time along a first axis as a function of distance segments of the fiber along a second axis and temperature as a function of color.

5. The method of claim 3 wherein the generating a display comprises generating a first alert responsive to all of a predetermined set of longitudinal segments of the fiber reaching a predetermined minimum cure temperature and generating a second alert responsive to all of the predetermined set of longitudinal segments of the fiber remaining above the predetermined minimum cure temperature for a predetermined period of time.

6. The method of claim 1 further comprising:
controlledly reducing the temperature of the liner after the heating of the liner; and
wherein the measuring the temperature of the optical fiber comprises measuring the temperature during the reducing of the temperature.

7. The method of claim 6 further comprising:
generating a display of the temperature of the optical fiber as a function of distance segments along a length of the fiber during the reducing of the temperature; and
generating a first alert responsive to the temperature reducing at a rate exceeding a predetermined temperature reduction rate in a distance segment of the fiber; and
generating a second alert during the reducing of the temperature responsive to the temperature falling below a predetermined cool down stop temperature.

8. A system for curing cured-in-place pipe liner in a pipe having a first longitudinal end, a second longitudinal end and a length between the first and second longitudinal ends comprising:
a single optical fiber disposed within the pipe extending longitudinally from at least the first end to the second end of the tube, the single optical fiber having a first longitudinal end, a second longitudinal end and a length between the first and second longitudinal ends;
a pipe liner within the tube extending longitudinally from the first end to the second end of the tube, the liner comprising a curable material for lining the tube;
a distributed temperature sensing unit coupled to the first end of the optical fiber adapted to measure the temperature of the optical fiber continuously along its length via distributed temperature sensing to generate temperature and time data, wherein said distributed sensing unit comprises DTS software for measuring the temperature to generate the temperature and time data, and wherein said interface comprises at least one application program interface, independent from said DTS software; and
an interface for interfacing with said distributed temperature sensing unit to gather said temperature and time data, and for interfacing with an underground asset management software system to at least transmit the temperature and time data to the underground asset management software system, or obtain tube data on said tube, said tube data comprising at least one of asset identification, asset history, and location, wherein said interface comprises a plurality of application program interfaces for interfacing; with a plurality of different distributed temperature sensing units.

9. A method of curing a cured-in-place liner within a tube, the tube having a first longitudinal end, a second longitudinal end, and a length between the first and second longitudinal ends, the method comprising:
placing a single optical fiber within the tube extending longitudinally from at least the first end to the second end of the tube, the optical fiber having a first longitudinal end, a second longitudinal end, and a length between the first and second longitudinal ends;
positioning a liner within the tube extending longitudinally from the first end to the second end of the tube, the liner comprising a curable material for lining the tube;
coupling the first longitudinal end of the optical fiber to a distributed temperature sensing unit:
heating the liner to cure the curable material;
measuring the temperature of the optical fiber along its length via distributed temperature sensing using the distributed temperature sensing unit with DTS software to generate temperature and time data;
gathering the temperature and time data;
transmitting the temperature and time data to an underground asset management software system; and
wherein gathering and transmitting the temperature and time data is performed using an interface having at least one application program interface, independent from said DTS software, and wherein said interface comprises a plurality of application program interfaces for interfacing with a plurality of different underground asset management software systems.

10. A method of curing a cured-in-place liner within a tube, the tube having a first longitudinal end, a second longitudinal end, and a length between the first and second longitudinal ends, the method comprising;
placing a single optical fiber within the tube extending longitudinally from at least the first end to the second end of the tube, the optical fiber having a first longitudinal end, a second longitudinal end, and a length between the first and second longitudinal ends;
positioning a liner within the tube extending longitudinally from the first end to the second end of the tube, the liner comprising a curable material for lining the tube;
coupling the first longitudinal end of the optical fiber to a distributed temperature sensing unit;
heating the liner to cure the curable material;
measuring the temperature of the optical fiber along its length via distributed temperature sensing using the distributed temperature sensing unit with DTS software to generate temperature and time data:
gathering the temperature and time data;
transmitting the temperature and time data to an underground asset management software system:
wherein gathering and transmitting the temperature and time data is performed using an interface having at least one application program interface, independent from said DTS software; and
wherein heating is performed using at least one apparatus selected from a heating apparatus, a pressurization apparatus, or a combination heating and pressurization apparatus, and wherein said interface is configured with an application program interface to interface with the at least one apparatus such that the at least one apparatus is controlled by said interface.

11. The method of claim 1 further comprising:
interfacing with said underground asset management software system and obtaining tube data on said tube, said tube data comprising at least one of asset identification, asset history, and location.

12. A system for curing cured-in-place pipe liner in a pipe having a first longitudinal end, a second longitudinal end and a length between the first and second longitudinal ends comprising:
a single optical fiber disposed within the pipe extending longitudinally from at least the first end to the second end of the tube, the single optical fiber having a first longitudinal end, a second longitudinal end and a length between the first and second longitudinal ends;

a pipe liner within the tube extending longitudinally from the first end to the second end of the tube, the liner comprising a curable material for lining the tube;

a distributed temperature sensing unit coupled to the first end of the optical fiber adapted to measure the temperature of the optical fiber continuously along its length via distributed temperature sensing to generate temperature and time data, wherein said distributed sensing unit comprises DTS software for measuring the temperature to generate the temperature and time data, and wherein said interface comprises at least one application program interface, independent from said DTS software; and an interface for interfacing with said distributed temperature sensing unit to gather said temperature and time data, and for interfacing with an underground asset management software system to at least transmit the temperature and time data to the underground asset management software system, or obtain tube data on said tube, said tube data comprising at least one of asset identification, asset history, and location, wherein said interface comprises a plurality of application program interfaces for interfacing with a plurality of different underground asset management software systems.

13. A system for curing cured-in-place pipe liner in a pipe having a first longitudinal end, a second longitudinal end and a length between the first and second longitudinal ends comprising:

a single optical fiber disposed within the pipe extending longitudinally from at least the first end to the second end of the tube, the single optical fiber haying a first longitudinal end, a second longitudinal end and a length between the first and second longitudinal ends;

a pipe liner within the tube extending longitudinally from the first end to the second end of the tube, the liner comprising a curable material for lining the tube;

a distributed temperature sensing unit coupled to the first end of the optical fiber adapted to measure the temperature of the optical fiber continuously along its length via distributed temperature sensing to generate temperature and time data, wherein said distributed sensing unit comprises DTS software for measuring the temperature to generate the temperature and time data, and wherein said interface comprises at least one application program interface, independent from said DTS software; and an interface for interfacing with said distributed temperature sensing unit to gather said temperature and time data, and for interfacing with an underground asset management software system to at least transmit the temperature and time data to the underground asset management software system, or obtain tube data on said tube, said tube data comprising at least one of asset identification, asset history, and location, wherein said interface is configured with an application program interface to interface with at least one apparatus selected from a heating apparatus, a pressurization apparatus, or a combination heating and pressurization apparatus, such that the apparatus is controlled by said interface.

14. The system of claim 8 wherein said interface transmits the temperature and time data to the underground asset management software system, and obtains tube data on said tube.

* * * * *